Oct. 27, 1925.  
H. B. CHALMERS  
1,558,790  
APPARATUS FOR FEEDING MOLTEN GLASS  
Filed June 4, 1923

Inventor:  
Harry Black Chalmers  
by W. H. Howiss  
Att'y.

Patented Oct. 27, 1925.

1,558,790

UNITED STATES PATENT OFFICE.

HARRY BLACK CHALMERS, OF YARRAVILLE, VICTORIA, AUSTRALIA, ASSIGNOR, BY MESNE ASSIGNMENTS, TO HARTFORD-EMPIRE COMPANY, OF HARTFORD, CONNECTICUT, A CORPORATION OF DELAWARE.

APPARATUS FOR FEEDING MOLTEN GLASS.

Application filed June 4, 1923. Serial No. 643,246.

*To all whom it may concern:*

Be it known that HARRY BLACK CHALMERS, subject of the King of Great Britain, residing at corner of Harrison Road and Lorne Street, Yarraville, in the State of Victoria, Commonwealth of Australia, has invented certain new and useful Improvements in Apparatus for Feeding Molten Glass, of which the following is a specification.

This invention relates to improvements in apparatus for feeding molten glass and separating it into mould charges suitable for blowing, pressing or other shaping purposes and more particularly refers to the feeding and separating of different predetermined weights of molten metal from the same feeder to two or more shaping instrumentalities.

In present practice the molten glass is contained in a tank from which it is segregated and separated into mould charges by various devices, some worked by hand and others mechanically operated. The efficiency of such devices when mechanically operated is dependent upon very careful manipulation during the time of segregation and separation and the delivery of the charge to the machine. The inherent viscosity and other peculiarities of molten glass make it difficult to handle. It flows slowly and chills rapidly; tends to adhere to heated surfaces; and when the finished product is obtained imperfections apparent therein may be traced to some disability which has not been provided for or overcome in the preliminary operation of feeding the charges or gobs. Further it has been found that the mode of delivery of these charges or gobs of molten glass must be controlled within comparatively fine limits so that the shaping machines may be uniformly fed.

The mechanical feeding of molten glass from a tank or container has received much study and is now a commercial success, very high efficiency being at present obtained. In practice, one feeding machine is capable of supplying several shaping or moulding machines and it is found desirable and economical to utilize such feeding device to its fullest capacity. The charges or gobs are delivered to shaping machines in predetermined weights and it may be mentioned that such weights vary within very fine limits.

It is often necessary to adapt one shaping machine to the production of articles of one weight and another shaping machine fed by the same feeding machine to the production of articles of another weight because at times difficulty may be experienced in keeping the shaping machines fully employed on articles of one weight; or articles of another weight may be urgently required.

This invention is particularly adaptable to such a feeding apparatus as that known as the Hartford Fairmont "needle feeder" and "Paddle needle feeder".

In adapting my invention to the before mentioned "Paddle needle feeder" no material alteration is made to its working parts and this adaptation is a convenient one for describing this invention.

In this class of machine the glass furnace is constructed so that the molten glass will flow or be directed therefrom to a holder or channel having an outlet through which the emission of the charges of glass are controlled by a vertically reciprocating needle or impeller. The means for operating the reciprocating needle is so constructed that the stroke of the said needle can be varied to increase or decrease the size of the charge or gob delivered by the machine at each successive operation.

Thus the further the needle is allowed to move downward into the outlet the more is the latter restricted in size and consequently a smaller charge or gob is emitted than when the needle does not descend so far into the said outlet.

The glass issuing from the outlet forms a gather from which mould charges are severed by shear blades reciprocating below the said outlet. The separated mould charges fall upon a chute which directs them successively to the moulds of the shaping machines.

The moulds are mounted on intermittently rotated tables which are operated so that the open moulds will be brought into position to receive the successive charges as they pass from the delivery end of the chute.

When the feeding machine is arranged to deliver charges to two shaping machines the separated charges are arranged to fall upon a short oscillating trough which is actuated by suitable gearing to direct the charges alternately to the delivery chutes leading to both the said shaping machines.

The needle is connected to a holder having forwardly and laterally projecting arms supporting vertical guide shafts adapted to reciprocate in bearings on the front of the frame of the furnace.

The object of the present invention is to provide improvements in glass feeding machines whereby charges or gobs of molten glass of different predetermined weights can be alternately fed to the chutes leading to the shaping machines so that articles of different sizes and/or formation can be manufactured without in any way interfering with the smooth working of the feeding or shaping machines.

I accomplish the above mentioned object by providing an attachment to the bearing of one of the guide shafts for the needle comprising a resiliently supported movable member having a connection with the oscillating trough associated with the delivery chutes whereby the movement of the said trough will cause the said member to be placed in advance of and removed from the path of the guide shaft at each alternate movement of the said trough to ensure the stroke of the needle to be varied to feed larger or smaller charges alternately to the shaping machines.

Provision is made for adjusting the position of the resiliently supported member so as to obtain any degree of variation between the weights or sizes of the charges fed to the two machines.

In order that the invention may be readily understood reference will now be had to the accompanying drawings wherein.

Figures 1, 2:
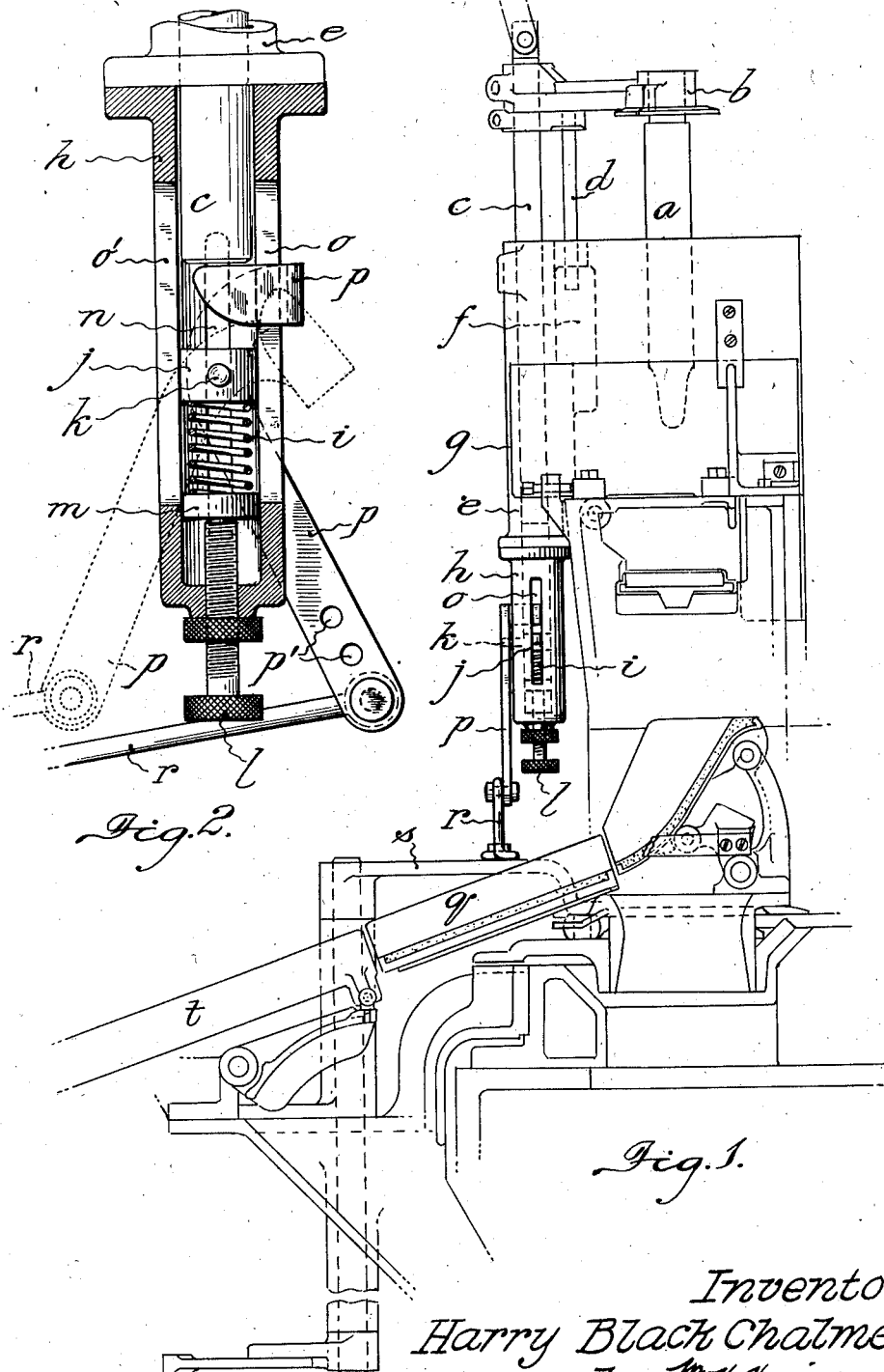
Figure 1 is a view in side elevation of an attachment constructed in accordance with the present invention shown applied to part of a feeding machine of the type hereinbefore referred to. In this view the attachment is shown in heavy lines and the existing construction is shown in faint lines.
Figure 2 is a view in sectional elevation of the attachment.

In the drawings the reference letter $a$ designates the needle which is supported by a holder $b$ provided with depending guide shafts $c$ and $d$. The guide shafts are adapted to reciprocate in vertical bearings $e$ and $f$ on the front of the furnace casing $g$ when the needle is actuated by a cam or other mechanism in the ordinary way.

The attachment comprised in the present invention consists of a sleeve or cylindrical casing $h$ which is bolted or otherwise affixed to the lower end of and in alignment with the bearing for the front guide shaft.

The sleeve or cylindrical casing $h$ is closed at its lower end and lying at the bottom thereof is a coil spring $i$ upon which is placed a cap or loose plug $j$ carrying a pivot pin $k$. An adjusting screw $l$ projects upwardly through the bottom of the sleeve or cylindrical casing and is adapted to raise or lower the pivot pin through the medium of the said spring. A block or disc $m$ rests upon the end of the screw $l$ and forms a seat for the spring $i$. The cylindrical casing or sleeve is provided with a vertical slot $n$ at the front and with two slots $o$ and $o'$ at the sides. Through the front slot $n$ projects the pivot pin $k$ before mentioned from the cap or plug at the head of the spring. To this pin is pivoted a bell crank lever $p$, the top portion of which is somewhat of an inverted L-shape and is bent half round, to allow of its end entering the other slot $o$ at the side at each alternate movement of the swinging trough $q$ located below the feeding orifice. The other end of the bell crank lever $p$ is connected by a link $r$ to a lever $s$ for operating the swinging trough or it may be connected to any other convenient operating part of the apparatus to give the necessary movement to the bell crank lever.

The slot $o'$ is provided to enable the lever $p$ to be substituted by another having an oppositely set upper end which will enter the said slot on the reverse movement of the arm $s$ to that required to cause the lever $p$ to enter the slot $o$. By employing either one or other of the two levers above described the operator can cause the larger or smaller charges to be delivered to either of the two shaping machines desired.

In operation the swinging trough $q$ receives the mould charges from the orifice and passes them along to one delivery chute $t$ and then to the other from which they gravitate into the respective shaping machines (not shown). The action of the link $r$ controlling the swinging trough $q$ on one stroke operates the bell crank lever $p$ through the link connecting them thereby causing its upper end to be inserted into the vertical slot $o$ or $o'$ in the side of the extension of the guide shaft casing or sleeve. The guide shaft on its descent strikes against and is stopped by the end of the bell crank lever thrust in its path in the casing and the spring $i$ takes any jar or shock. Upon the other action of the link controlling the swinging trough the end of the bell crank lever $p$ is withdrawn from the slot in the casing and the guide or stroke shaft is allowed to descend upon the loose plug $j$ or to the limit of its stroke.

The effect of this is to govern the needle through the guide or stroke shaft in its action on the molten glass at the orifice whereby when the needle has free movement to the extent of its stroke the delivery of molten glass through the orifice to the swinging trough will be lesser than when the needle is retarded.

It will be obvious that fine adjustments in the weight of metal delivered can be made with this invention by so arranging the adjusting screw and the size of the end of the bell crank lever that the stroke shaft will be retarded to any desired extent at predetermined times.

I claim:—

1. In apparatus for feeding molten glass wherein a container is provided with an outlet for molten glass which is controlled by a reciprocating needle having a fixed connection with guide shafts supported reciprocating in bearings, a sleeve extension on one of one of the guide shafts, a resiliently mounted abutment supported by said extension, and means for placing the said abutment in the path of movement of the guide shaft upon each alternate movement of the needle to vary the sizes of charges delivered from the feeding apparatus.

2. In an apparatus as claimed in claim 1 an oscillating trough disposed beneath the outlet and a link connection between the movable abutment and the said trough.

3. In apparatus as claimed in claim 1, a sleeve extension on the bearing of a guide shaft, a slot in the front and slots in the sides of the sleeve extension, a plug or cap resiliently supported within the said sleeve extension, a bell crank lever pivoted to the plug or cap and having its upper end shaped to enter a slot in the side of the extension sleeve, and means for actuating the said lever to place its upper end into the path of movement of the guide shaft at each alternate descent thereof.

4. In an apparatus as claimed in claim 1 a sleeve extension on the bearing of a guide shaft, a slot in the front and a slot in the side of the said sleeve extension, a block loosely mounted in the sleeve extension, a coiled spring supporting the said block, a bell crank lever pivotally supported on a pin passing through one slot and carried by said block, a curved upper end on the lever shaped to enter the second slot and to lie in the path of movement of the guide rod when rocked in one direction, and a link connection between the lower end of the lever and an operative part of the machine whereby the lever will be operated to enter and move away from the sleeve extension prior to alternate descending movements of the guide shaft.

5. In an apparatus as claimed in claim 1, a closed lower end on the sleeve extension, an adjustable screw passing axially through the bottom of the sleeve extension, a disc or block resting on the end of the adjustable screw, and a coil spring seated on the disc or block and supporting the block carrying the bell crank lever, substantially as described.

6. In an apparatus as claimed in claim 1, a link connection between the lower end of the lever and a trough supported oscillatingly below the outlet for the glass, and means for adjustably connecting the link connection to the lever.

7. Apparatus for feeding separated mold charges of molten glass, comprising a glass container having a submerged outlet, an implement adapted to extend into the glass in said container, means for vertically reciprocating said implement to control the flow of glass through said outlet, and means for terminating the downward movement of said implement at different depths in a cyclic order, to vary the size of the mold charges delivered through said outlet.

8. Apparatus for feeding separated mold charges of molten glass, comprising a glass container having a submerged outlet, an implement adapted to extend into the glass in said container and in axial alignment with said outlet, means for vertically reciprocating said implement to control the flow of glass through said outlet, and means for varying the extent of the downward movements of said implement in a cyclic order to vary the size of the mold charges delivered through said outlet.

9. Apparatus for feeding separated mold charges of molten glass, comprising a glass container having a submerged outlet, an implement extending into the glass in said container for controlling the flow of glass through said outlet, means for vertically reciprocating said implement, and means for terminating the downward movement of different strokes of said implement at different levels in a cyclic order to vary the size of the mold charges delivered through said outlet.

10. Apparatus for feeding separated mold charges of molten glass, comprising a container having a submerged outlet, an implement extending into the glass in said container for controlling the flow of glass through said outlet, means for vertically reciprocating said implement, and means for terminating the downward movements of alternate strokes of said implement at different levels to vary the size of the mold charges delivered through said outlet.

11. The method of feeding mold charges of molten glass which consists in discharging glass through an outlet in a container, reciprocating an implement in said glass to control the discharge thereof through the outlet and terminating the downward movement of said implement at different depths in a cyclic order to vary the size of the mold charges discharged through said outlet.

12. The method of feeding mold charges of molten glass which consists in discharging glass through an outlet in a container, reciprocating an implement in said glass to control the discharge thereof through the outlet and terminating the downward movement of alternate strokes of said implement at different depths to vary the size of the mold charges discharged through said outlet.

In testimony whereof I affix my signature.

HARRY BLACK CHALMERS.